US007562122B2

(12) United States Patent
Oliver et al.

(10) Patent No.: US 7,562,122 B2
(45) Date of Patent: Jul. 14, 2009

(54) MESSAGE CLASSIFICATION USING ALLOWED ITEMS

(75) Inventors: Jonathan J. Oliver, San Carlos, CA (US); David A. Koblas, Los Altos, CA (US); Brian K. Wilson, Palo Alto, CA (US)

(73) Assignee: SonicWALL, Inc., Sunnyvale, CA (US)

( * ) Notice: Subject to any disclaimer, the term of this patent is extended or adjusted under 35 U.S.C. 154(b) by 0 days.

(21) Appl. No.: 11/927,497

(22) Filed: Oct. 29, 2007

(65) Prior Publication Data

US 2008/0104185 A1 May 1, 2008

Related U.S. Application Data

(63) Continuation of application No. 10/616,703, filed on Jul. 9, 2003, now Pat. No. 7,406,502, and a continuation-in-part of application No. 10/371,987, filed on Feb. 20, 2003.

(60) Provisional application No. 60/476,419, filed on Jun. 6, 2003.

(51) Int. Cl.
*G06F 15/16* (2006.01)

(52) U.S. Cl. .................. 709/206; 709/224; 709/229; 709/246; 726/3; 726/24

(58) Field of Classification Search ......... 709/203–207, 709/217–219, 224, 229, 246; 726/2, 23, 726/4, 13–14
See application file for complete search history.

(56) References Cited

U.S. PATENT DOCUMENTS

| | | | |
|---|---|---|---|
| 5,999,929 A | 12/1999 | Goodman | |
| 6,052,709 A | 4/2000 | Paul | |
| 6,072,942 A | 6/2000 | Stockwell et al. | |
| 6,076,101 A | 6/2000 | Kamakura et al. | |
| 6,112,227 A | 8/2000 | Heiner | |
| 6,161,130 A * | 12/2000 | Horvitz et al. | ............... 709/206 |
| 6,199,102 B1 | 3/2001 | Cobb | |
| 6,234,802 B1 | 5/2001 | Pella et al. | |
| 6,266,692 B1 | 7/2001 | Greenstein | |
| 6,421,709 B1 | 7/2002 | McCormick et al. | |
| 6,424,997 B1 | 7/2002 | Buskirk et al. | |
| 6,438,690 B1 | 8/2002 | Patel et al. | |
| 6,453,327 B1 | 9/2002 | Nielsen | |

(Continued)

OTHER PUBLICATIONS

Agrawal et al., "Controlling spam emails at the routers", IEEE International Conference on Communications, 2005.*

(Continued)

*Primary Examiner*—Oanh Duong
(74) *Attorney, Agent, or Firm*—Carr & Ferrell LLP

(57) ABSTRACT

A system and method are disclosed for classifying a message. The method includes receiving the message, identifying all items of a certain type in the message, determining whether each of the items meets a criterion, and in the event that all the items are determined to meet the criterion, determining a classification of the message. The system includes an interface configured to receive the message, a processor coupled to the interface, configured to identify all items of a certain type in the message; determine whether each of the items meets a criterion; and in the event that all the items are determined to meet the criterion, determine a classification of the message.

14 Claims, 5 Drawing Sheets

U.S. PATENT DOCUMENTS

| | | | |
|---|---|---|---|
| 6,539,092 B1 | 3/2003 | Kocher | |
| 6,546,416 B1 | 4/2003 | Kirsch | |
| 6,615,242 B1 | 9/2003 | Riemers | |
| 6,640,301 B1 | 10/2003 | Ng | |
| 6,643,686 B1 | 11/2003 | Hall | |
| 6,650,890 B1 | 11/2003 | Irlam et al. | |
| 6,654,787 B1* | 11/2003 | Aronson et al. | 709/206 |
| 6,691,156 B1 | 2/2004 | Drummond et al. | |
| 6,708,205 B2 | 3/2004 | Sheldon et al. | |
| 6,728,378 B2 | 4/2004 | Garib | |
| 6,732,149 B1 | 5/2004 | Kephart | |
| 6,772,196 B1 | 8/2004 | Kirsch et al. | |
| 6,778,941 B1 | 8/2004 | Worrell et al. | |
| 6,779,021 B1 | 8/2004 | Bates et al. | |
| 6,829,635 B1 | 12/2004 | Townshend | |
| 6,842,773 B1 | 1/2005 | Ralston et al. | |
| 6,851,051 B1 | 2/2005 | Bolle et al. | |
| 6,868,498 B1 | 3/2005 | Katsikas | |
| 6,876,977 B1 | 4/2005 | Marks | |
| 6,931,433 B1 | 8/2005 | Ralston et al. | |
| 6,941,348 B2 | 9/2005 | Petry et al. | |
| 6,963,928 B1 | 11/2005 | Bagley et al. | |
| 6,965,919 B1* | 11/2005 | Woods et al. | 709/206 |
| 7,003,724 B2 | 2/2006 | Newman | |
| 7,006,993 B1 | 2/2006 | Cheong et al. | |
| 7,016,875 B1 | 3/2006 | Steele et al. | |
| 7,016,877 B1 | 3/2006 | Steele et al. | |
| 7,076,241 B1 | 7/2006 | Zondervan | |
| 7,103,599 B2* | 9/2006 | Buford et al. | 707/10 |
| 7,127,405 B1 | 10/2006 | Frank et al. | |
| 7,149,778 B1* | 12/2006 | Patel et al. | 709/206 |
| 7,178,099 B2* | 2/2007 | Meyer et al. | 715/210 |
| 7,206,814 B2* | 4/2007 | Kirsch | 709/206 |
| 7,231,428 B2 | 6/2007 | Teague | |
| 7,293,063 B1* | 11/2007 | Sobel | 709/206 |
| 7,299,261 B1* | 11/2007 | Oliver et al. | 709/206 |
| 7,406,502 B1* | 7/2008 | Oliver et al. | 709/206 |
| 2001/0044803 A1 | 11/2001 | Szutu | |
| 2001/0047391 A1* | 11/2001 | Szutu | 709/206 |
| 2002/0046275 A1 | 4/2002 | Crosbie et al. | |
| 2002/0087573 A1 | 7/2002 | Reuning et al. | |
| 2002/0116463 A1* | 8/2002 | Hart | 709/206 |
| 2002/0143871 A1* | 10/2002 | Meyer et al. | 709/204 |
| 2002/0162025 A1 | 10/2002 | Sutton et al. | |
| 2002/0188689 A1 | 12/2002 | Michael | |
| 2002/0199095 A1* | 12/2002 | Bandini et al. | 713/151 |
| 2003/0009526 A1 | 1/2003 | Bellegarda et al. | |
| 2003/0023692 A1 | 1/2003 | Moroo | |
| 2003/0023736 A1 | 1/2003 | Abkemeier | |
| 2003/0041126 A1 | 2/2003 | Buford et al. | |
| 2003/0041280 A1 | 2/2003 | Malcolm et al. | |
| 2003/0046421 A1 | 3/2003 | Horvitz et al. | |
| 2003/0069933 A1* | 4/2003 | Lim et al. | 709/206 |
| 2003/0105827 A1 | 6/2003 | Tan et al. | |
| 2003/0120651 A1* | 6/2003 | Bernstein et al. | 707/6 |
| 2003/0126136 A1* | 7/2003 | Omoigui | 707/10 |
| 2003/0149726 A1 | 8/2003 | Spear | |
| 2003/0158903 A1 | 8/2003 | Rohall et al. | |
| 2003/0167311 A1 | 9/2003 | Kirsch | |
| 2003/0195937 A1 | 10/2003 | Kircher et al. | |
| 2003/0204569 A1 | 10/2003 | Andrews et al. | |
| 2003/0229672 A1 | 12/2003 | Kohn | |
| 2003/0233418 A1 | 12/2003 | Goldman | |
| 2004/0003283 A1 | 1/2004 | Goodman et al. | |
| 2004/0015554 A1 | 1/2004 | Wilson | |
| 2004/0024639 A1 | 2/2004 | Goldman | |
| 2004/0030776 A1 | 2/2004 | Cantrell et al. | |
| 2004/0059786 A1 | 3/2004 | Caughey | |
| 2004/0083270 A1 | 4/2004 | Heckerman et al. | |
| 2004/0107190 A1* | 6/2004 | Gilmour et al. | 707/3 |
| 2004/0117451 A1 | 6/2004 | Chung | |
| 2004/0148330 A1* | 7/2004 | Alspector et al. | 709/200 |
| 2004/0158554 A1 | 8/2004 | Trottman | |
| 2004/0162795 A1 | 8/2004 | Dougherty et al. | |
| 2004/0167964 A1 | 8/2004 | Rounthwaite et al. | |
| 2004/0177120 A1* | 9/2004 | Kirsch | 709/206 |
| 2005/0055410 A1 | 3/2005 | Landsman et al. | |
| 2005/0081059 A1 | 4/2005 | Bandini et al. | |
| 2005/0125667 A1 | 6/2005 | Sullivan et al. | |
| 2005/0172213 A1 | 8/2005 | Ralston et al. | |
| 2006/0010217 A1 | 1/2006 | Sood | |
| 2006/0031346 A1* | 2/2006 | Zheng et al. | 709/206 |
| 2006/0036693 A1 | 2/2006 | Hulten et al. | |
| 2006/0282888 A1* | 12/2006 | Bandini et al. | 726/14 |

OTHER PUBLICATIONS

"DM Strategies Making a Living On Opt-In Email Marketing", Interactive PR & Marketing News, Feb. 19, 1999 vol. 6, Issue 4.*
U.S. Appl. No. 10/422,359, Wilson et al., unpublished.
Anon., "Tagged Message Deliveery Agent (TMDA)," http://tmda.net/index.html, NO DATE.
Anon., "Giant Company Software announces full integrated AOL Support for its popular Spam Inspector anti-spam software," http://giantcompany.com/pressRelease.aspx, NO DATE.
Bryan,Georgantopolous, "MScin Speech and Language Processing Dissertation: Automatic summarizing based on sentence extraction: A statistical approach," Department of Linguistics, University of Edinburgh, http://cgi.di.uoa.gr/~bryon/msc.html, NO DATE.
D.H. Lie, "Sumatra: A system for Automatic Summary Generation," http://www.carptechnologies.nl/SumatraTWLT14paper/SumatraTWLT14.html, NO DATE.
Anon., "Correspondence Negotiation Protocol," http://ww.cs.sfu.ca/~cameron/CNP.html, NO DATE.
Anon., "DigiPortal Software, Creating Order from Chaos," Support, Frequently Asked Questions, http://ww/digiportal.com/support/choicemail/faq.html, NO DATE.
Anon., "Challenge Messages," Mailblocks, http://suport.mailblocks.com/tab_howto/Validation/detail_privacy_challenge.asp, NO DATE.
Anon., "How Challenge/Response Works," http://about.mailblocks.com/challenge.html, NO DATE.
Razor-agents 2.22, http://razor.sourceforge.net, NO DATE.
Anon., "Project: Vipul's Razor: Summary," http://sourceforge.net/projects/razor/, NO DATE.
Spamarrest, The Product, How it Works, http://spamarrest.com/products/howitworks.jsp, NO DATE.
SpamAssassin, "Welcome to SpamAssassin," http://spamassassin.org, NO DATE.

* cited by examiner

| Signature | acceptable | un-acceptable | unclassified | probability of being acceptable |
|---|---|---|---|---|
| 2388745 | 200 | 0 | 0 | 99% |
| 3762984 | 15 | 406 | 5 | 5% |
| 3941536 | 200 | 300 | 1000 | 45% |

Figure 5

MESSAGE CLASSIFICATION USING ALLOWED ITEMS

CROSS REFERENCE TO RELATED APPLICATIONS

This application is a continuation and claims the priority, benefit of U.S. Pat. application Ser. No. 10/616,703 filed Jul. 9, 2003, now U.S. Pat. No. 7,406,502 issued Jul. 29, 2008 and entitled "Message Classification Using Allowed Items," which claims the priority benefit of U.S. Provisional Patent Application No. 60/476,419 filed Jun. 6, 2003 and entitled "A Method for Classifying Email Using White Content Thumbprints," and which is a continuation in part of co-pending U.S. patent application Ser. No. 10/371,987 filed Feb. 20, 2003 and entitled "Using Distinguishing Properties to Classify Messages" all of which are incorporated herein by reference for all purposes.

FIELD OF THE INVENTION

The present invention relates generally to message classification. More specifically, a technique for avoiding junk messages (spam) is disclosed.

BACKGROUND OF THE INVENTION

Electronic messages have become an indispensable part of modern communication. Electronic messages such as email or instant messages are popular because they are fast, easy, and have essentially no incremental cost. unfortunately, these advantages of electronic messages are also exploited by marketers who regularly send out unsolicited junk messages. The junk messages are referred to as "spam", and spam senders are referred to as "spammers". Spam messages are a nuisance for users. They clog people's inbox, waste system resources, often promote distasteful subjects, and sometimes sponsor outright scams.

There are a number of commonly used techniques for classifying messages and identifying spam. For example, blacklists are sometimes used for tracking known spammers. The sender address of an incoming message is compared to the addresses in the blacklist. A match indicates that the message is spam and prevents the message from being delivered. Other techniques such as rule matching and content filtering analyze the message and determine the classification of the message according to the analysis. Some systems have multiple categories for message classification. For example, a system may classify a message as one of the following categories: spam, likely to be spam, likely to be good email, and good email, where only good email messages are allowed through and the rest are either further processed or discarded.

Spam-blocking systems sometimes misidentify non-spam messages. For example, a system that performs content filtering may be configured to identify any messages that include certain word patterns, such as "savings on airline tickets" as spam. However, an electronic ticket confirmation message that happens to include such word patterns may be misidentified as spam or possibly spam. Misidentification of good messages is undesirable, since it wastes system resources, and in the worst case scenario, causes good messages to be classified as spam and lost.

It would be useful to have a technique that would more accurately identify non-spam messages. Such a technique would not be effective if spammers could easily alter parts of the spam messages they sent so that the messages would be identified as non-spam. Thus, it would also be desirable if non-spam messages identified by such a technique is not easily spoofed.

BRIEF DESCRIPTION OF THE DRAWINGS

The present invention will be readily understood by the following detailed description in conjunction with the accompanying drawings, wherein like reference numerals designate like structural elements, and in which:

FIG. 5 is a table used for aggregating user inputs, according to one system embodiment.

DETAILED DESCRIPTION

Figure 1:
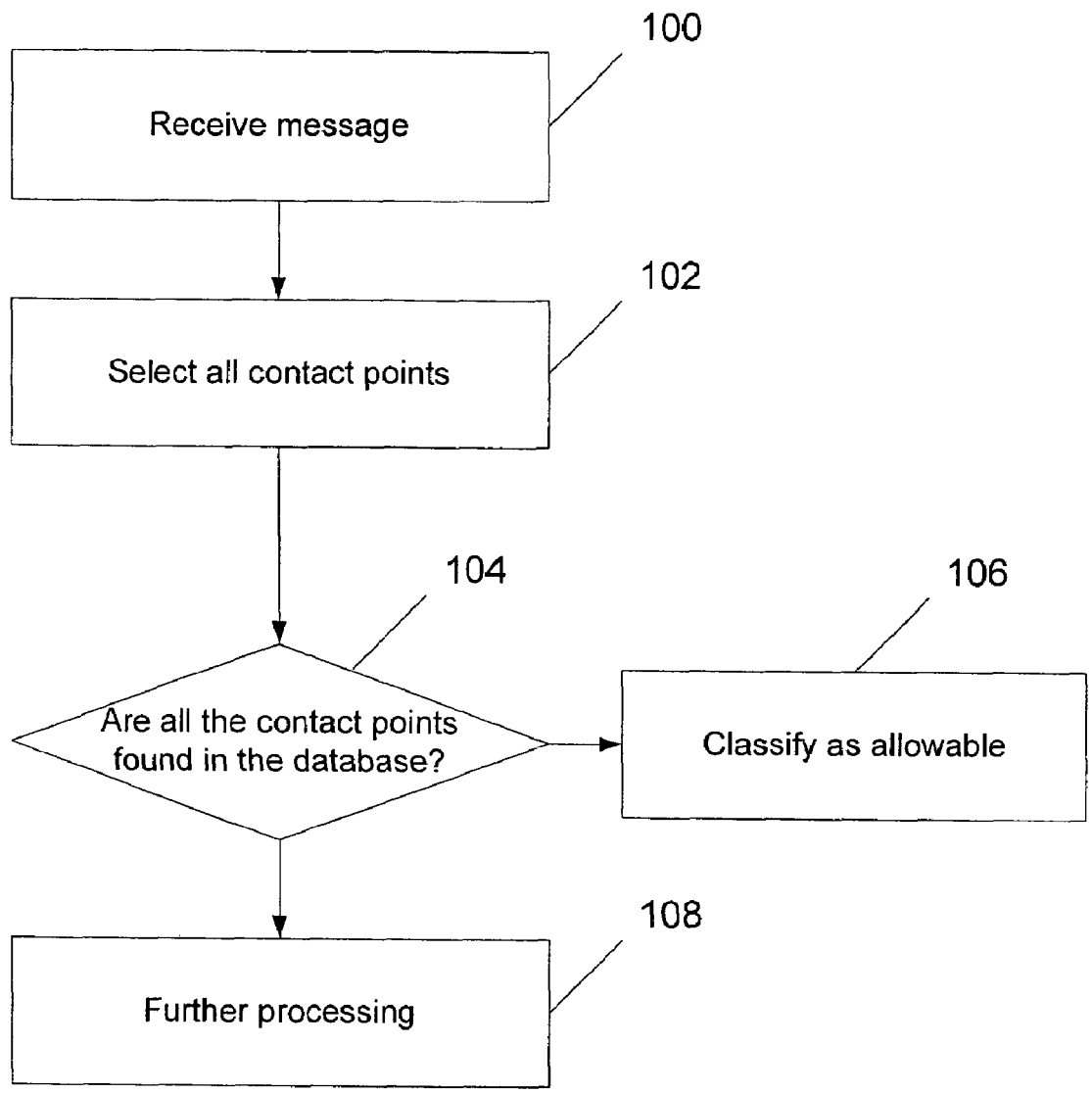
FIG. 1 is a flowchart illustrating the message classification process according to one embodiment.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In U.S. patent application Ser. No. 10/371,987 by Wilson, et al filed Feb. 20, 2003 entitled: "USING DISTINGUISHING PROPERTIES TO CLASSIFY MESSAGES" which is herein incorporated by reference for all purposes, a technique using distinguishing properties to identify electronic messages is described. The technique uses distinguishing properties within messages, such as contact information, to identify messages that have previously been classified. In some embodiments, the technique is applied to identify spam messages. However, spammers aware of such a detection scheme may change their contact information frequently to prevent their messages from being identified.

An improved technique is disclosed. The technique prevents spammers from circumventing detection by using items in the message to identify non-spam messages. All items of a certain type in the message are identified, and checked to determine whether they meet a certain criterion. In some embodiments, the items are distinguishing properties or signatures of distinguishing properties. They are identified and looked up in a database. In various embodiments, the database may be updated by a registration process, based on user input, and/or post-processing stored messages. In some embodiments, the items are looked up in a database of acceptable items. A message is classified as non-spam if all the items are found in the database. If not all the items are found in the database, the message is further processed to determine its classification.

Spammers generally have some motives for sending spam messages. Although spam messages come in all kinds of forms and contain different types of information, nearly all of them contain some distinguishing properties for helping the senders fulfill their goals. For example, in order for the spammer to ever make money from a recipient, there must be some way for the recipient to contact the spammer. Thus, most spam messages include at least one contact point, whether in the form of a phone number, an address, a universal resource locator (URL), or any other appropriate information for establishing contact with some entity. These distinguishing properties, such as contact points, instructions for performing certain tasks, distinctive terms such as stock ticker symbols, names of products or company, or any other information essential for the message, are extracted and used to identify messages.

Similarly, non-spam messages may also have distinguishing properties. For example, electronic ticket confirmations and online purchase orders commonly include contact points such as URL's, email addresses, and telephone numbers to the sender's organization. It is advantageous that spam messages always include some distinguishing properties that are different from the distinguishing properties in non-spam messages. For example, the URL to the spammer's website is unlikely to appear in any non-spam message. To identify non-spam messages, a database is used for storing acceptable distinguishing properties. The database may be a table, a list, or any other appropriate combination of storage software and hardware. A message that only has acceptable distinguishing properties is unlikely to be spam. Since information that is not distinguishing is discarded during the classification process, it is more difficult for the spammers to alter their message generation scheme to evade detection.

For the purpose of example, details of email message processing using contact points and contact point signatures to determine whether the message is acceptable are discussed, although it should be noted that the technique are also applicable to the classification of other forms of electronic messages using other types of items. It should also be noted that different types of criterion and classification may be used in various embodiments.

FIG. 1 is a flowchart illustrating the message classification process according to one embodiment. A message is received (100), and all the contact points are selected (102). It is then determined whether all the contact points can be found in a database of previously stored acceptable contact points (104). If all the contact points are found in the database, the message is classified as non-spam and delivered to the user (106). The contact points that are not found in the database may be contact points for a spammer or contact points for a legitimate sender that have not yet been stored in the database. Thus, if not all contact points are found in the database, the message cannot be classified as non-spam and further processing is needed to accurately classify the message (108). The processing may include any appropriate message classification techniques, such as performing a whitelist test on the sender's address, using summary information or rules to determine whether the content of the message is acceptable, etc.

In some embodiments, the system optionally generates signatures based on the selected contact points. The signatures can be generated using a variety of methods, including compression, expansion, checksum, hash functions, etc. The signatures are looked up in a database of acceptable signatures. If all the signatures are found in the database, the message is classified as non-spam; otherwise, the message is further processed to determine its classification. Since signatures obfuscate the actual contact point information, using signatures provides better privacy protection for the intended recipient of the message, especially when the classification component resides on a different device than the recipient's.

Figure 2:
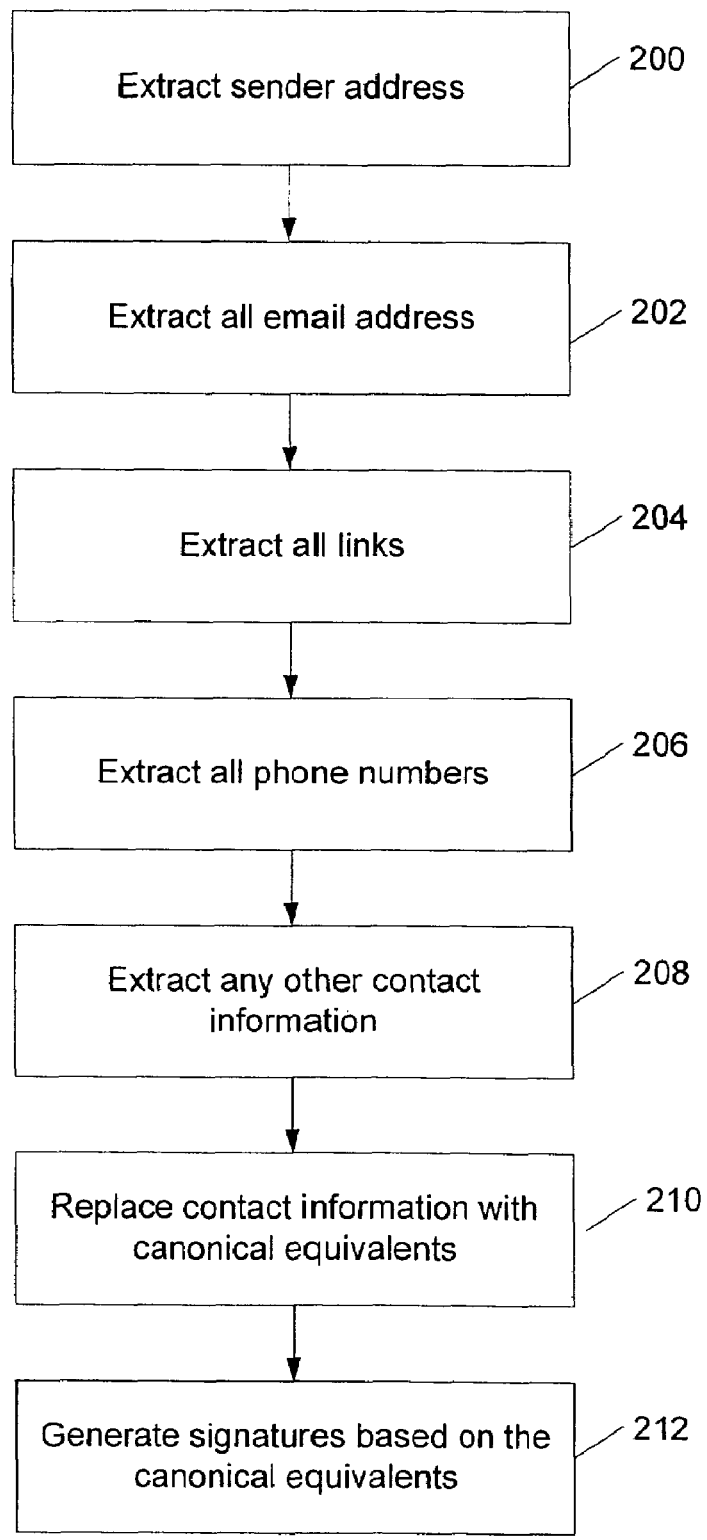
FIG. 2 is a flowchart illustrating the details of the signature generation process according to one embodiment.

FIG. 2 is a flowchart illustrating the details of the signature generation process according to one embodiment. Various contact points are extracted from the message and used to generate the signatures. This process is used both in classifying incoming messages and in updating the database with signatures that are known to be from non-spam. The sender address, email addresses, links to URLs such as web pages, images, etc. and the phone numbers in the message are extracted (200, 202, 204, 206). There are many ways to extract the contact information. For example, telephone numbers usually include 7-10 digits, sometimes separated by dashes and parenthesis. To extract telephone numbers, the text of the message is scanned, and patterns that match various telephone number formats are extracted. Any other appropriate contact information is also extracted (208).

The extracted contact points are then reduced to their canonical equivalents (210). The canonical equivalent of a piece of information is an identifier used to represent the same information, regardless of its format. For example, a telephone number may be represented as 1-800-555-5555 or 1(800)555-5555, but both are reduced to the same canonical equivalent of 18005555555. In some embodiments, the canonical equivalent of an URL and an email address is the domain name. For example, http://www.mailfrontier.com/contact, www.mailfrontier.com/support and jon@mailfrontier.com are all reduced to the same canonical equivalent of mailfrontier.com. It should be noted that there are numerous techniques for arriving at the canonical equivalent of any distinguishing property, and different implementation may employ different techniques.

After the contact points are reduced to their canonical equivalents, signatures corresponding to the canonical equivalents are generated and added to the database (212). There are various techniques for generating the signature, such as performing a hash function or a checksum function on the characters in the canonical equivalent.

The database shown in this embodiment stores signatures that correspond to various acceptable contact points. Such a database is also used in the subsequent embodiments for the purposes of illustration. It should be noted that the acceptable contact points, other distinguishing property and/or their signatures may be stored in the database in some embodiments.

Figure 3:
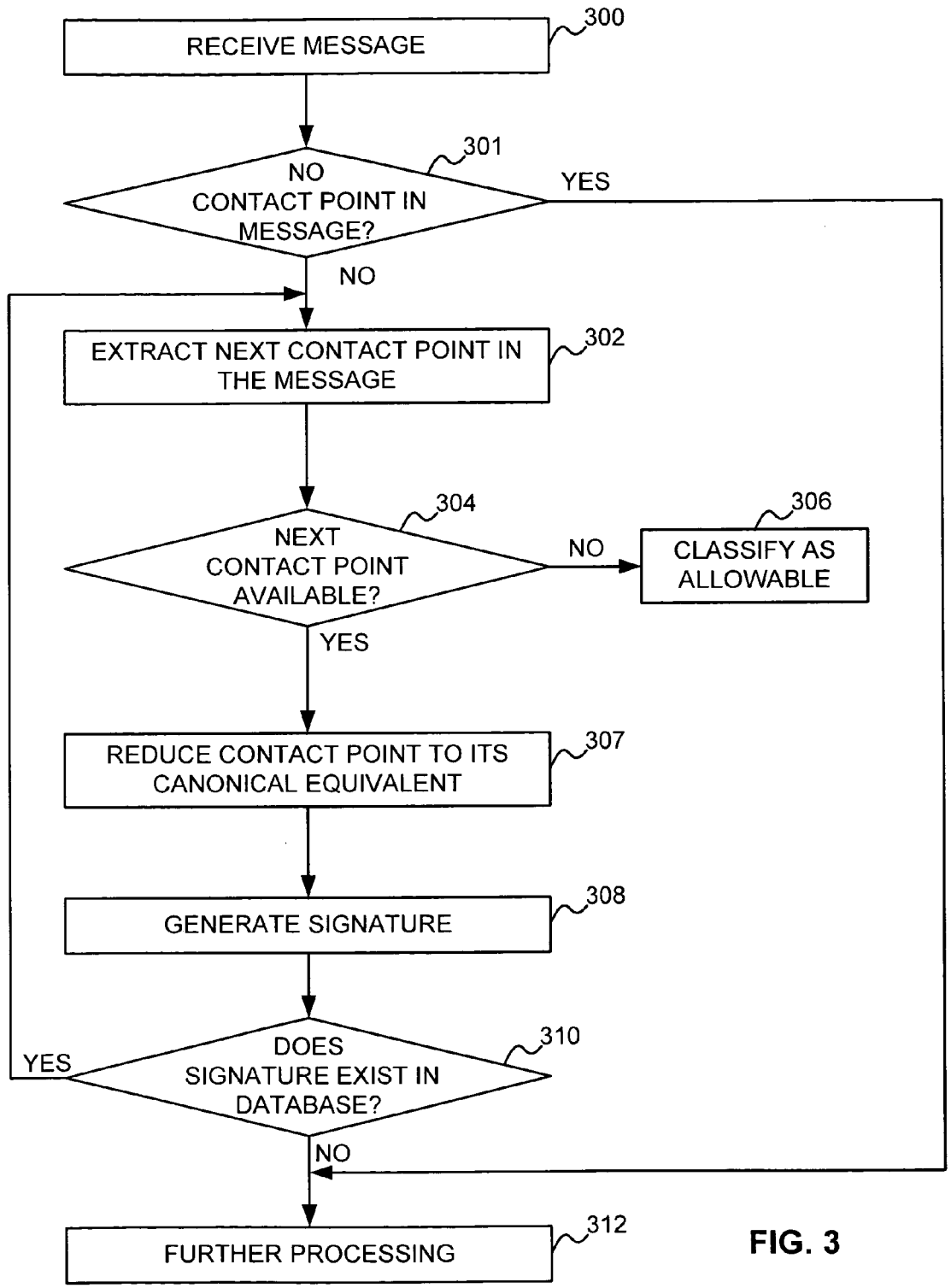
FIG. 3 is a flow chart illustrating the classification of a message according to another embodiment.

FIG. 3 is a flow chart illustrating the classification of a message according to another embodiment. In this embodiment, each contact point of the message is tested and used to classify the message. Once the message is received (300), it is optionally determined whether the message includes any contact points (301). If the message does not include any contact points, the message may or may not be spam. Therefore, control is transferred to 312 to further process the message to classify it. If the message includes at least one contact point, the message is parsed and an attempt is made to extract the next contact point in the message (302). There may not be another contact point to be extracted from the message if all the distinguishing properties in the message have been processed already. Hence, in the next step, it is determined whether the next contact point is available (304). If there are no more distinguishing properties available, the test has concluded without finding any contact point in the message that does not already exist in the database. Therefore, the message is classified as acceptable (306).

If the next contact point is available, it is reduced to its canonical equivalent (307) and a signature is generated based on the canonical equivalent (308). It is then determined whether the signature exists in the database (310). If the signature does not exist in the database, there is a possibility that the message is spam and further processing is needed to classify the message (312). If, however, a signature exists in the database, it indicates that the contact point is acceptable and control is transferred to step 302 where the next contact point in the message is extracted and the process of generating and comparing the signature is repeated.

For the message classification technique to be effective, the database should include as many signatures of acceptable contact points as possible, and exclude any signatures of contact points that may be distinguishing for spam messages. In some embodiments, the database is updated using a registration process. The registration process allows legitimate businesses or organizations to store contact points used in the messages they send to their customers or target audience at a central spam filtering location. The legitimacy of the organization is established using certificates such as the certificate issued by a certificate authority such as Verisign, an identifier or code issued by a central spam filtering authority, or any other appropriate certification mechanism that identifies the validity of an organization.

Figure 4:
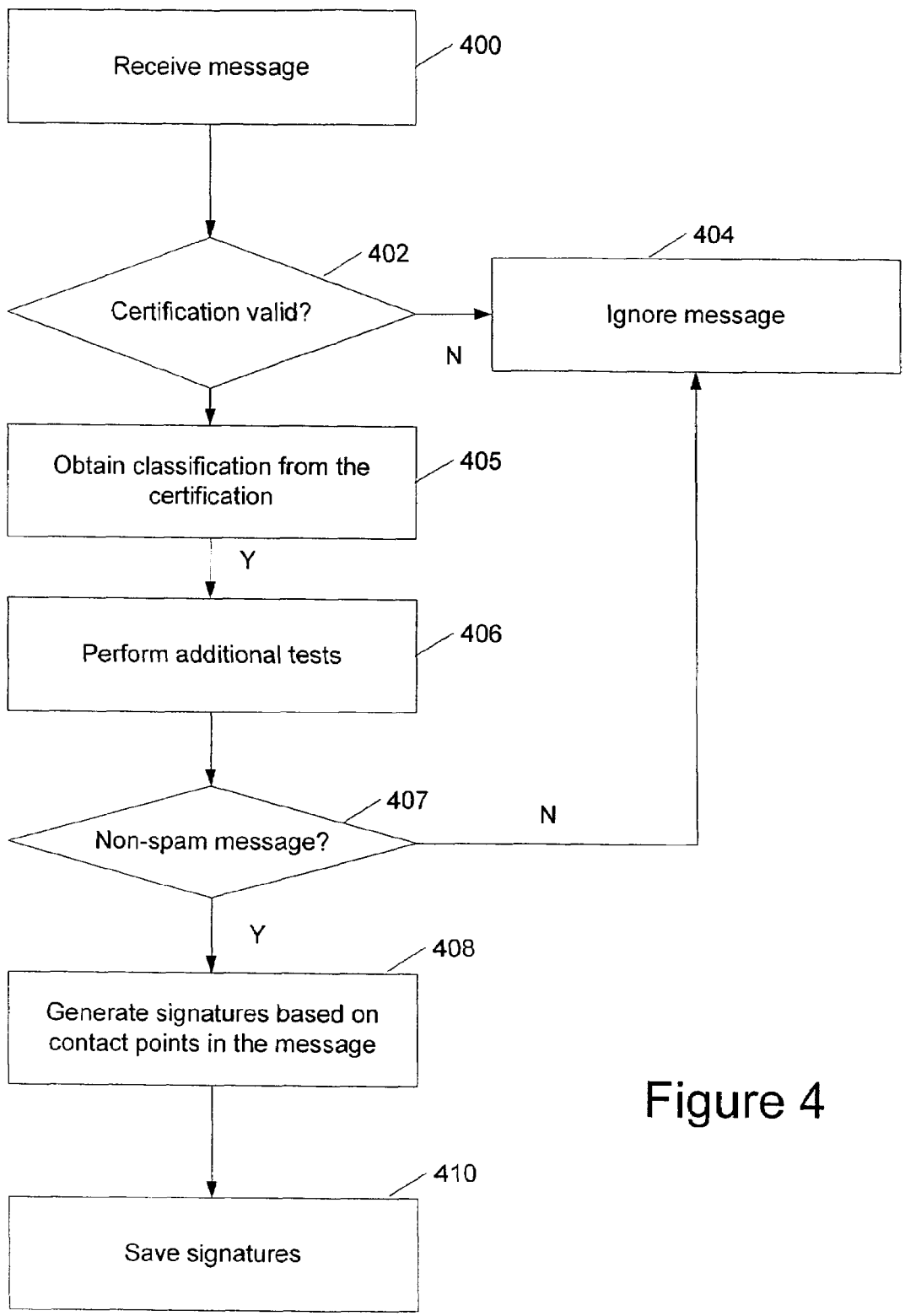
FIG. 4 is a flow chart illustrating a registration process for updating the database, according to one embodiment.

FIG. 4 is a flow chart illustrating a registration process for updating the database, according to one embodiment. Once a registration message is received (400), it is determined whether the certificate is valid (402). If the certificate is not valid, the message is ignored (404). In this embodiment, if the message certificate is valid, optional steps 405, 406 and 407 are performed. The classification of the message sender is obtained from the certificate (405). It is then further tested using other spam determination techniques to determine whether the message is spam (406). This optional step is used to prevent spammers from obtaining a valid certificate and add their spam messages to the database. If the message is determined to be spam by these additional tests, control is transferred to step 404 and the message is ignored. If, however, the message is determined to be non-spam, one or more signatures are generated based on the contact points in the message (408). The signatures, sender classification, and other associated information for the message are then saved in the database (410).

Different organizations or individuals may have different criteria for which messages are acceptable, and may only allow a subset of the registered signature database. In some embodiments, the signature database from the registration site is duplicated by individual organizations that wish to use the signature database for spam blocking purposes. The system administrators or end users are then able to customize their message filtering policies using the database entries. Using a policy allows some database entries to be selected for filtering purposes.

In some embodiments, the database is updated dynamically as messages are received, based on classifications made by the recipients. Preferably, the system allows for collaborative spam filtering where the response from other recipients in the system is incorporated into the message classification process. Different recipients of the same message may classify the message, therefore the contact points in the message, differently. The same contact point may appear in a message that is classified as non-spam as well as a message that is classified as spam. The system aggregates the classification information of a contact point, and determines whether it should be added to the database of acceptable contact points.

FIG. 5 is a table used for aggregating user inputs, according to one system embodiment. The system extracts the contact points in the messages and generates their signature. The state of each signature is tracked by three counters: acceptable, unacceptable, and unclassified, which are incremented whenever a message that includes the contact point is classified as non-spam, spam or unknown, respectively. A probability of being acceptable is computed by the system based on the counter values and updated periodically. A signature is added to the database once its probability of being acceptable exceeds a certain threshold. In some embodiments, the signature is removed from the database if its probability of being acceptable falls below the threshold.

In some embodiments, the database is updated by post-processing previously stored messages. The messages are classified as spam or non-spam using spam classification techniques and/or previous user inputs. The contact points are extracted, their signatures generated, and their probabilities of being acceptable are computed. The signatures of the contact points that are likely to be acceptable are stored in the database.

An improved technique for classifying electronic messages has been disclosed. The technique uses distinguishing properties in a message and its corresponding signature to classify the message and determine whether it is acceptable. In some embodiments, the distinguishing properties are contact points. A database of registered signatures is used in the classification process, and can be customized to suit the needs of individuals. The technique has low overhead, and is able to quickly and accurately determine non-spam messages.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for classifying an e-mail message, the method comprising:

tracking one or more user designations concerning validity of the e-mail message;

determining a probability of validity based on the tracked user designations concerning the validity of the e-mail message;

determining that the e-mail message includes a valid certificate of authenticity;

identifying from the valid certificate a classification concerning a sender of the e-mail message;

generating one or more signatures based on contact information in the e-mail message;

providing the sender classification and the one or more signatures to a database used to classify a subsequently received e-mail message when the probability exceeds a predetermined threshold; and removing the sender classification and the one or more signatures from the database when the probability falls below the predetermined threshold.

2. The method of claim 1, further comprising evaluating the e-mail message to determine whether the message is spam.

3. The method of claim 1, further comprising receiving information concerning the e-mail message by intercepting the e-mail message.

4. The method of claim 1, further comprising receiving information concerning the e-mail message by extracting the information from stored e-mail messages.

5. The method of claim 1, wherein determining that the e-mail message includes a valid certificate further comprises receiving a user designation concerning validity of the e-mail message.

6. The method of claim 1, wherein generating one or more signatures further comprises:
   determining a canonical equivalent of the contact information; and
   generating the one or more signatures based on the canonical equivalent.

7. The method of claim 1, further comprising classifying the subsequently received e-mail message based on a match between contact information in the subsequently received e-mail message and information in the database.

8. The method of claim 1, further comprising customizing the database to a user, wherein customizing the database comprises:
   receiving a user designation concerning a subset of the database; and
   classifying e-mail messages sent to the user based on information in the designated subset of the database.

9. The method of claim 8, wherein receiving the user designation comprises receiving a criterion from the user concerning e-mail messages in the database and further comprising determining the subset of the database based on the criterion received from the user.

10. The method of claim 1, further comprising filtering the subsequently received message based on the classification of the subsequently received message.

11. An apparatus for classifying an e-mail message, the apparatus comprising:
   a memory configured to store a database for classifying e-mail messages;
   an interface configured to receive one or more user designations concerning validity of the e-mail message; and
   a processor configured to execute software to:
      track the one or more user designations concerning validity of the e-mail Message;
      determine a probability of validity based on the tracked user designations concerning the validity of the e-mail message;
      determine that the e-mail message includes a valid certificate of authenticity;
      identify from the valid certificate a classification concerning a sender of the e-mail message;
      generate one or more signatures based on contact information in the e-mail message;
      provide the sender classification and the one or more signatures to the database stored in the memory when the probability exceeds a predetermined threshold, and
      remove the sender classification and the one or more signatures from the database when the probability falls below the predetermined threshold.

12. The apparatus of claim 11, wherein the processor is further configured to execute software to:
   determine a canonical equivalent of the contact information; and
   generate the one or more signatures based on the canonical equivalent.

13. The apparatus of claim 11, wherein the processor is further configured to customize the database to a user by:
   receiving a user designation concerning a subset of the database; and
   classifying e-mail messages sent to the user based on information in the designated subset of the database.

14. A computer-readable storage medium, having embodied thereon a program, the program being executable by a processor to perform a method for classifying an e-mail message, the method comprising:
   tracking one or more user designations concern validity of the e-mail message;
   determining a probability of validity based on the tracked user designations concerning the validity of the e-mail message;
   determining that the e-mail message includes a valid certificate of authenticity;
   identifying from the valid certificate a classification concerning a sender of the e-mail message;
   generating one or more signatures based on contact information in the e-mail message;
   providing the sender classification and the one or more signatures to a database used to classify a subsequently received e-mail message when the probability exceeds a predetermined threshold; and
   removing the sender classification and the one or more signatures from the database when the probability falls below the predetermined threshold.

* * * * *